(12) United States Patent
Hillstrom et al.

(10) Patent No.: US 6,895,705 B2
(45) Date of Patent: May 24, 2005

(54) LIGHT PANEL

(75) Inventors: Brian J. Hillstrom, Milford, MI (US); Robert Krohn, Annapolis, MD (US)

(73) Assignee: Marketing Display, Inc., Farmington Hills, MI (US)

( * ) Notice: Subject to any disclaimer, the term of this patent is extended or adjusted under 35 U.S.C. 154(b) by 0 days.

(21) Appl. No.: 10/439,264

(22) Filed: May 15, 2003

(65) Prior Publication Data

US 2004/0226202 A1 Nov. 18, 2004

(51) Int. Cl.$^7$ ............................................... G09F 13/18
(52) U.S. Cl. .......................................... 40/546; 362/31
(58) Field of Search ............................ 40/546; 362/31

(56) References Cited

U.S. PATENT DOCUMENTS

| | | |
|---|---|---|
| 1,959,616 A | 5/1934 | Derrah |
| 2,082,724 A | 6/1937 | Shelor |
| 2,091,342 A | 8/1937 | Van Bloem |
| 2,886,911 A | 5/1959 | Hardesty |
| 2,948,074 A | 8/1960 | Dupree |
| 3,262,224 A | 7/1966 | Hardesty |
| 3,384,986 A | 5/1968 | Davis |
| 3,389,247 A | 6/1968 | Null |
| 3,399,476 A | 9/1968 | Davis |
| 3,698,793 A | 10/1972 | Tellerman |
| 4,285,889 A | 8/1981 | Parsons |
| 4,373,282 A | 2/1983 | Wragg |
| 4,385,343 A | 5/1983 | Plumly |
| 4,715,137 A | 12/1987 | Scheve |
| 4,811,507 A | 3/1989 | Blanchet |
| 4,890,201 A | 12/1989 | Toft |
| 4,924,356 A | 5/1990 | French et al. |

(Continued)

FOREIGN PATENT DOCUMENTS

| | | |
|---|---|---|
| EP | 0 945 674 A1 | 9/1999 |
| GB | 2281 142 A | 2/1995 |
| WO | WO 98/37535 | 8/1998 |
| WO | WO 99/00625 | 1/1999 |
| WO | WO 01/26080 A1 | 4/2001 |
| WO | WO 02/42038 | 5/2002 |

*Primary Examiner*—Gary C. Hoge
(74) *Attorney, Agent, or Firm*—Harness, Dickey & Pierce, P.L.C.

(57) ABSTRACT

A display device is provided comprising a transparent panel having a light receiving edge and a face. A plurality of laser etched grooves are formed in the face of the panel such that the grooves increase in depth as the grooves extend away from the light receiving edge of the panel. The grooves include a bottom surface having a contour that matches a contour of the face of the panel. The grooves also include a plurality of diffusive sections and a plurality of internally reflective sections.

16 Claims, 4 Drawing Sheets

U.S. PATENT DOCUMENTS

| | | |
|---|---|---|
| 4,947,300 A | 8/1990 | Wen |
| 4,965,950 A | 10/1990 | Yamada |
| 4,974,122 A | 11/1990 | Shaw |
| 4,974,354 A | 12/1990 | Hembrook, Jr. |
| 5,064,276 A * | 11/1991 | Endo et al. ................... 362/31 |
| 5,075,826 A | 12/1991 | Lan |
| 5,124,890 A | 6/1992 | Choi et al. |
| 5,215,285 A | 6/1993 | Lewis |
| 5,227,773 A | 7/1993 | Wu et al. |
| 5,228,223 A | 7/1993 | Lan |
| 5,251,391 A | 10/1993 | Lan |
| 5,283,968 A | 2/1994 | Williams |
| 5,295,050 A | 3/1994 | Helstern et al. |
| 5,386,347 A | 1/1995 | Matsumoto |
| 5,390,436 A | 2/1995 | Ashall |
| 5,400,224 A | 3/1995 | DuNah et al. |
| 5,402,324 A | 3/1995 | Yokoyama et al. |
| 5,408,388 A | 4/1995 | Kobayashi et al. |
| 5,414,947 A | 5/1995 | Hjaltason |
| 5,433,024 A | 7/1995 | Lerner |
| 5,499,165 A | 3/1996 | Holmes, Jr. |
| 5,521,796 A | 5/1996 | Osakada et al. |
| 5,676,444 A | 10/1997 | Liao |
| 5,682,697 A | 11/1997 | Hjaltason |
| 5,735,590 A | 4/1998 | Kashima et al. |
| 5,842,297 A | 12/1998 | Tung |
| 5,887,964 A | 3/1999 | Higuchi et al. |
| 5,915,855 A | 6/1999 | Murase et al. |
| 5,950,340 A | 9/1999 | Woo |
| 5,997,148 A | 12/1999 | Ohkawa |
| 5,999,685 A | 12/1999 | Goto et al. |
| 6,086,211 A | 7/2000 | Ohkawa |
| 6,131,322 A | 10/2000 | Hjaltason |
| 6,231,200 B1 | 5/2001 | Shinohara et al. |
| 6,286,970 B1 * | 9/2001 | Egawa et al. ................. 362/31 |
| 6,308,444 B1 | 10/2001 | Ki |
| 6,334,690 B1 | 1/2002 | Ohkawa |
| 6,364,497 B1 | 4/2002 | Park et al. |
| 6,384,881 B1 | 5/2002 | Arai et al. |
| 6,467,922 B1 * | 10/2002 | Blanc et al. .................. 362/31 |
| 2001/0002165 A1 | 5/2001 | Shinohara et al. |
| 2001/0022721 A1 | 9/2001 | Konomi |
| 2001/0049893 A1 | 12/2001 | Maas et al. |
| 2002/0015300 A1 | 2/2002 | Katsu et al. |
| 2002/0039287 A1 | 4/2002 | Ohkawa |
| 2002/0048162 A1 | 4/2002 | Ohkawa et al. |
| 2002/0048165 A1 | 4/2002 | Taniguchi et al. |
| 2002/0051354 A1 * | 5/2002 | Egawa ........................ 362/31 |
| 2002/0051355 A1 | 5/2002 | Egawa et al. |
| 2002/0057561 A1 | 5/2002 | Niida et al. |
| 2002/0057562 A1 | 5/2002 | Sasako et al. |
| 2002/0059860 A1 | 5/2002 | Yoo |
| 2002/0080433 A1 | 6/2002 | Baba |
| 2002/0080597 A1 | 6/2002 | Coghlan |
| 2002/0080598 A1 | 6/2002 | Parker et al. |
| 2002/0085368 A1 | 7/2002 | Taniguchi et al. |
| 2002/0101729 A1 | 8/2002 | Hayashi et al. |
| 2002/0105793 A1 | 8/2002 | Oda et al. |
| 2002/0114149 A1 | 8/2002 | Yamashita et al. |
| 2002/0114150 A1 | 8/2002 | Nakamura |
| 2002/0114151 A1 | 8/2002 | Lee |
| 2003/0058634 A1 * | 3/2003 | Kunimochi et al. .......... 362/31 |
| 2004/0022049 A1 * | 2/2004 | Chang et al. ................. 362/31 |

* cited by examiner

FIG 3A
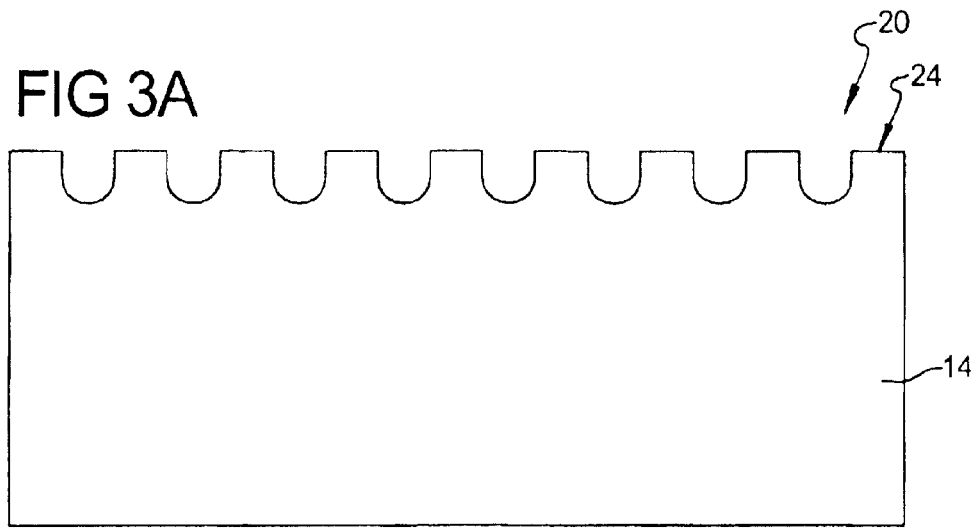
FIG 3B
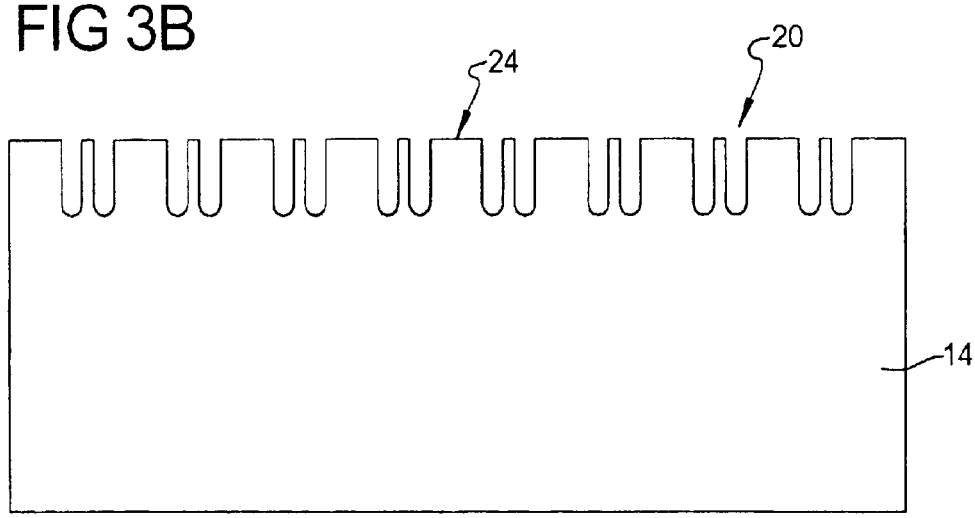
FIG 3C

FIG 4A
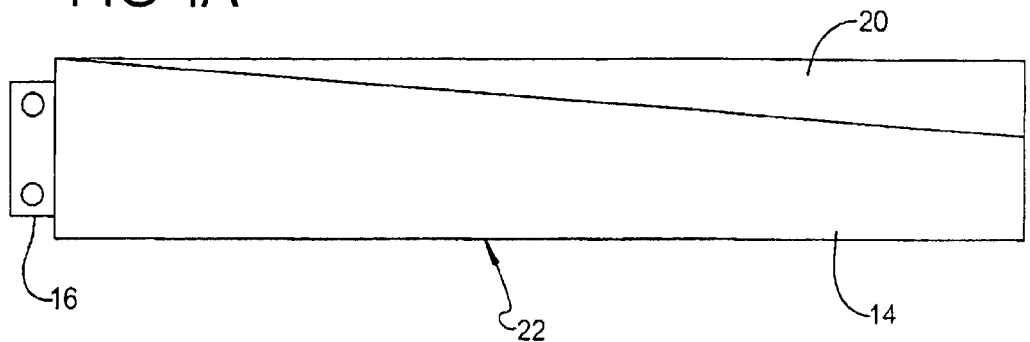
FIG 4B
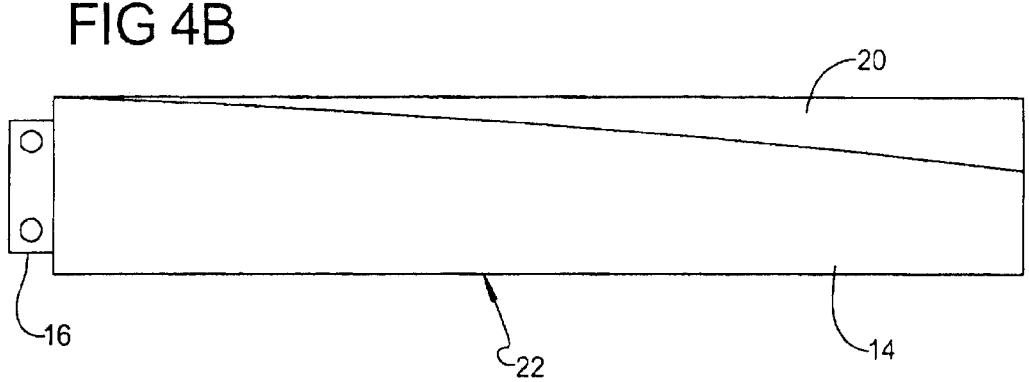
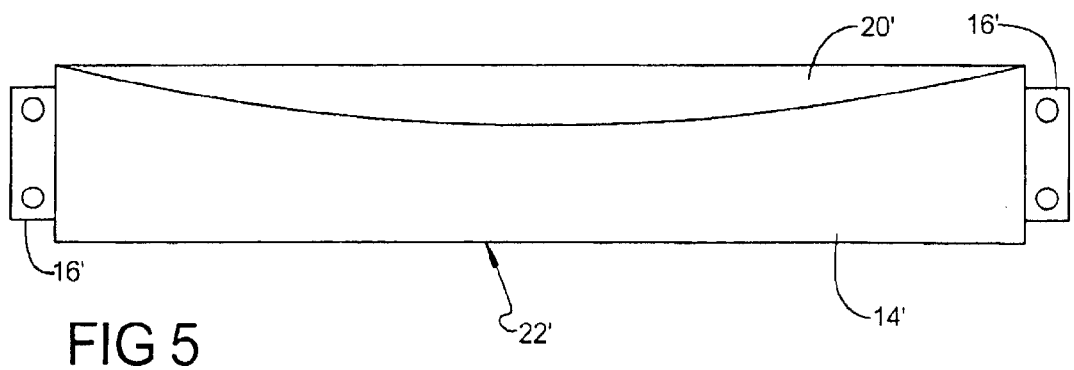
FIG 5

LIGHT PANEL

FIELD OF THE INVENTION

The present invention relates to illuminated sign boxes and more particularly to a light panel for such an illuminated sign box.

BACKGROUND OF THE INVENTION

Commercial signs are designed to display advertising and images for products or services. One type of commercial sign is known in the art as an illuminated sign box. An illuminated sign box includes at least one internal light source for illuminating the advertising graphic that forms part of the display.

One type of illuminated sign box is known as an edge lit sign box. In an edge lit sign box, a frame is provided to support the advertising graphic as well as the light source. The light source is secured to the edge of a light panel, typically an acrylic or glass member formed as a square panel with nearly planar front and back surfaces. The light from the lamp is directed into the edge of the light panel (the light receiving edge) and, due to internal reflection, the light propagates throughout and fills the light panel. The light is then emitted from at least one of the nearly planar surfaces of the light panel (the light emitting face).

To emit the light from the face of the light panel, light dispersion mechanisms are incorporated into the light panel. Such light dispersion mechanisms disrupt the internal reflection of the light within the light panel thereby causing the light to pass through the face of the light panel. Examples of light dispersion mechanisms incorporated into light panels include etched convexities and concavities, as well as printed designs such as lines and dots.

A primary goal of light dispersion mechanisms in sign boxes is to provide the brightest and most uniform emission of light from the face of the light panel. This causes the graphic illuminated within the sign box to be attractively displayed with minimum dark spots. Unfortunately, as the distance from the light source increases, the light intensity diminishes so a noticeably darker portion of the display may result.

One way to combat non-uniform light emission from a light panel is to vary the pattern of the light dispersion mechanism. For example, the light dispersion mechanism may be provided with a spacing, size or both which vary relative to the distance from the light source. If designed properly, such variations may provide a uniform display.

While the above technique of providing uniform displays has achieved great commercial success, there is still room for improvement in the art. For example, conventional techniques for forming light dispersion grooves in light panels rely on mechanical formation techniques such as v-cutting, wherein the grooves are scratched into the surface of the light panel, and engraving, wherein the grooves are routed into the surface of the light panel with a rotating bit. Such mechanical techniques have drawbacks such as the inability to adjust the depth of the groove relative to any contours in the surface of the light panel and the inability to form a groove with discontinuous diffusive properties. Such mechanical techniques are also limited as to the degree of control over the width and depth of the grooves.

More particularly, mechanical techniques vary the depth of the grooves relative to a plane defined above the surface of the light panel by the fixture holding the tool (e.g., the cutter or bit). As such, the depth of the groove formed in the light panel may be varied relative to the plane above the surface of the panel, but the groove depth does not vary relative to contours in the surface of the light panel itself which may be present due to tolerance variations in the panel forming process. In addition, mechanical techniques work continuously so that adjacent portions along the length of the groove are rendered the same. In particular, the diffusiveness of the groove is the same throughout the length of the groove. This limits the achievable brightness of the display. Finally, the brightest, most uniform display requires grooves that barely mark the surface of the panel at the edge of the panel adjacent the light source and dramatically increase toward the center of the light panel. This degree of control is extremely difficult if not impossible with mechanical techniques.

In view of the foregoing, it would be desirable to provide a light panel which is brighter than conventional light panels and a technique for producing the same.

SUMMARY OF THE INVENTION

A display device is provided comprising a transparent panel having a light receiving edge and a pair of opposite faces. At least one of the faces of the panel includes a plurality of laser etched grooves which increase in depth as the grooves extend away from the light receiving edge of the panel. The grooves include a bottom surface contoured to match a contour of the face of the panel. The grooves also include a plurality of diffusive sections co-mingled with a plurality of internally reflecting sections.

A method of making a display device is also provided. The method comprises laser etching a plurality of grooves in at least one face of a transparent panel. The laser is controlled during the etching step to increase a depth of the grooves as the grooves extend away from an edge of the panel. The controlling step comprises changing at least one of a speed and a power of the laser as the focus of the laser moves across the panel along the path of the grooves. The laser may also be pulsed during the etching step to form a plurality of diffusive sections within the groove.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A–3C are cross-sectional views of several embodiments of the light panel of the present invention.

FIGS. 4A and 4B are cross-sectional views of two embodiments of the light panel of a second embodiment of the present invention.

FIG. 5 is a cross-sectional view of another embodiment of the light panel of the present invention.

DETAILED DESCRIPTION OF THE PREFERRED EMBODIMENTS

The following description of the preferred embodiments is merely exemplary in nature and is in no way intended to limit the invention, its application, or uses.

The present invention is directed towards a light box and light panel. Advantageously, the light panel includes laser etched light dispersion mechanisms. Being laser etched, the light panel provides superior brightness as compared to mechanically etched light panels (50–100% brighter). More particularly, the laser etched grooves of the present invention are formed to various depths relative to a surface of the light panel itself rather than relative to the operating plane of a mechanical cutting device. The laser etched grooves of the present invention also include a plurality of diffusive portions and a plurality of internally reflective portions. This provides a distinct advantage in the amount of light propagating through and emitting from the light panel.

Figure 1:
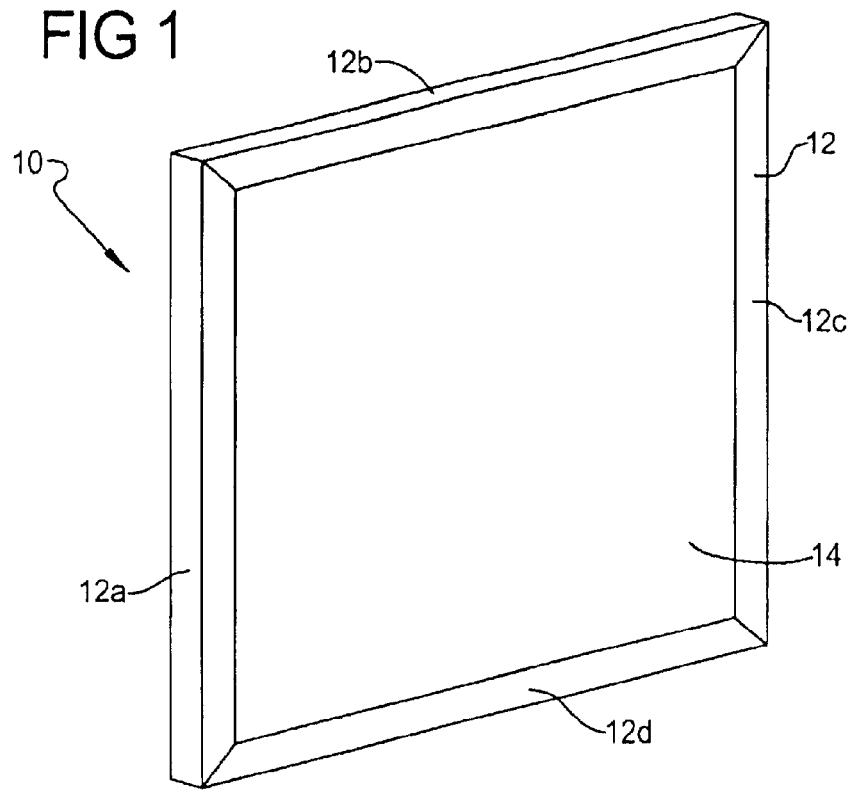
FIG. 1 is a perspective view of a display device in accordance with the teachings of the present invention.

Turning now to FIG. 1, a light box is shown generally at 10. The light box 10 includes a square frame 12 in the form of a plurality of mating extrusions 12a–12d. The mating extrusions 12a–12d are fixed to one another at each end to form the frame 12. The frame 12 encloses a light source (see FIG. 2) relative to a light panel 14.

Figure 2:
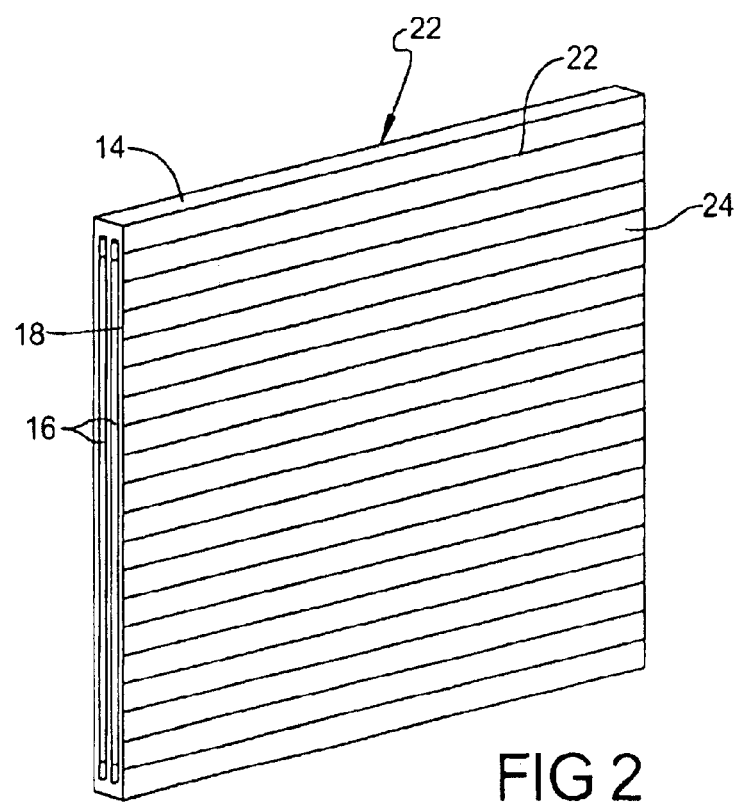
FIG. 2 is a perspective view of a light panel and light source sub-assembly according to the present invention.

Referring to FIG. 2, the light source 16 is disposed adjacent a light receiving edge 18 of the light panel 14. Radiation emitted from the light source 16 enters the light panel 14 through the light receiving edge 18 and propagates through and fills the light panel 14. Although not illustrated, a reflector housing is generally provided to support the light source 16 along the light panel 14 and to provide directivity to the radiation emitted from the light source 16.

Although various light sources may be used in conjunction with the present invention, cold cathode fluorescent lamps are presently preferred. Even more preferably, a pair of parallel cold cathode fluorescent lamps are employed. It should also be noted that although the illustration depicts a single edge lit display (wherein only one edge of the light panel receives radiation from the light source), the present invention is equally applicable to double edge lit displays (wherein two opposite edges of the light panel receive radiation from a pair of light sources).

The light panel 14 is formed of a transparent material such as glass, acrylic, or the like. In the preferred embodiment of the present invention, the light panel 14 is formed of acrylic. Even more preferably, the acrylic is cast rather than extruded. A cast acrylic light panel provides a very desirable surface hardness and is readily susceptible to laser treatment as described below.

The light panel 14 includes a plurality of spaced apart grooves 20 formed in a face thereof. It should be appreciated that the number of grooves 20 shown in FIG. 2 is far less than would be present in practice but is illustrated in this manner for the aid of viewing. The grooves 20 may be formed in the light emitting face 22 of the light panel 14, but are preferably formed in the face 24 opposite thereto. This makes the grooves 20 less visible when the light panel 14 is used in its intended environment.

The grooves 20 are etched in an array of parallel lines along the face 24 of the light panel 14 which extend perpendicularly (or substantially perpendicularly) away from the light source 16. The grooves 20 function to disperse the radiation from the light source 16 within the light panel 14. This causes the radiation to emit from the light emitting face 22 of the light panel 14. Absent such dispersion, the radiation may well remain within the light panel 14 due to total internal reflection.

Turning now to FIGS. 3A–3C, the plurality of grooves 20 are shown in greater detail. In these figures the relative dimensions of the grooves 20 and the light panel 14 are grossly exaggerated to aid viewing. The grooves 20 are formed with a U-shaped cross-section including a pair of nearly parallel sidewalls interconnected by an arcuate bottom surface. The sidewalls of the grooves 20 are preferably essentially orthogonal to the face 24 of the light panel 14 but may be slightly angled relative thereto.

As shown in FIG. 3A, the grooves 20 may be equidistantly spaced apart across the face 24 of the panel 14. Alternatively, as shown in FIG. 3B, the grooves 20 may be spaced at unequal intervals if desired. If the grooves 20 are arranged parallel to the light source, the distance between adjacent grooves may decrease as the distance away from the light source increases. Such progressive spacing may provide greater light emission further away from the light source where it is desired the most for uniform display. Also, as shown in FIG. 3C, since the grooves 20 are formed with a laser, they may be made very thin, e.g., 0.0025 to 0.0035 inch. As such, multiple thin grooves 20 may be formed very close to one another to provide a brighter display than possible with a single wide groove.

Turning now to FIGS. 4A and 4B, a cross-sectional view through a single groove 20 of the light panel 14 is shown. The groove 20 increases in depth (i.e., deepens) as the groove 20 extends away from the light source 16. This allows a uniform amount of light to emit from the light panel 14 along the face 22 since the groove 20 is more emissive farther away from the light source 16 where the intensity of the radiation from the light source 16 is the least. That is, as the intensity of the radiation from the light source 16 diminishes, the groove 20 deepens. As such, uniform emission is achieved.

As shown in FIG. 4A, the groove 20 may deepen along a constant taper if desired. However, as shown in FIG. 4B, it is presently preferred to stagger the depth of the groove 20 at various points away from the light source 16. This is because the intensity of the radiation does not diminish linearly. The particular points at which to vary the depth of the groove 20 varies depending upon the power of the light source 16 and the size of the light panel 14. Although the points at which the slope of the groove depth varies is illustrated as being nearly instantaneous, in practice there may be a transition zone where the groove transitions from a first, nearly constant, slope rate to a second, nearly constant but different, slope rate. The size of the transition zone is controlled as desired by the rate at which the power or speed (or both) of the laser that is etching the groove 20 changes.

Turning now to FIG. 5, an alternate embodiment light panel 14' is illustrated. The light panel 14' is identical to the first embodiment with the exception of the geometry of the groove 20'. In the first embodiment, the groove 20 was designed for use in conjunction with a single edge lit panel wherein all the radiation from the light source 16 enters one edge of the light panel 14. As such, the groove 20 continuously deepens from the light receiving edge of the light panel 14 to the opposite edge. In contrast, the light panel 14' is designed to work in conjunction with a double edge lit light box wherein radiation is received along two opposite edges of the light panel 14'. As such, the groove 20' deepens as it extends away from the light sources 16' and has its deepest portion in a central region of the light panel 14'. Although only a continuously tapering groove 20' is illustrated, it should be appreciated that a staggered groove 20' may be provided similar to that shown in FIG. 4B.

Figure 6:
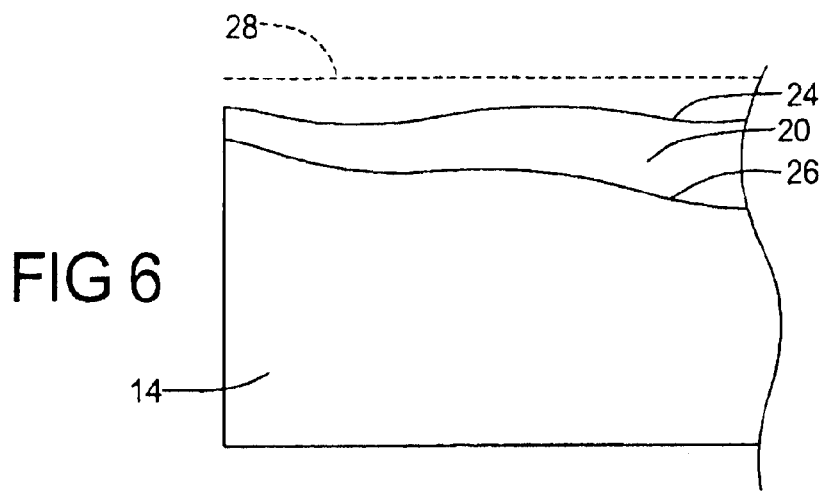
FIG. 6 is an enlarged cross-sectional view of an exemplary groove formed in the light panel according to the present invention.

Turning now to FIG. 6, an enlarged cross-sectional view of a portion of the light panel 14 of the present invention is illustrated. The face 24 of the light panel 14 includes certain undulations attributable to the tolerance of the manufacturing process for casting the acrylic forming the panel 14. For example, a 0.315 inch thick light panel made of cast acrylic may have tolerances of ±20% although ±10% is more common. The groove 20 is formed such that its depth is controlled relative to the face 24 of the light panel 14. In this way, the bottom surface 26 of the groove 20 has a contour which matches the contour of the face 24. This is different than conventional light panels since the depth of the grooves formed in conventional, mechanically etched, light panels is dependent on an arbitrary plane, shown by dashed line 28 in FIG. 6, defined above the face 24 of the light panel 14. The dashed line 28 represents the plane of the fixture that holds the tool used for scratching or engraving conventional light panels. Such mechanically etched grooves are inferior since the face of the panel inconsistently varies relative to the bottom surface of the groove due to the undulations resulting from manufacturing tolerances. In other words, the contours of face of the panel and the depth of the groove are independent of one another. The laser etched grooves 20 of the present invention are superior in that their depth is independent of any arbitrary plane and etching depth is controlled relative to the face 24 of the panel 14 such that the contours of the grooves 20 follow the contours of the face 24.

Figure 7:
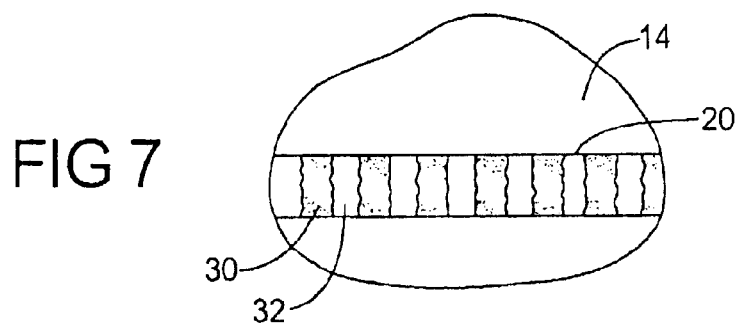
FIG. 7 is an enlarged plan view of an exemplary groove formed in the light panel according to the present invention.

Turning now to FIG. 7, laser etching the grooves 20 of the panel 14 also provides a unique optical pattern within the grooves 20. More particularly, the laser is preferably pulsed during the etching process such that the grooves 20 are formed as a series of consecutive dots. That is, each impingement point of the laser vaporizes a select amount of panel material. Immediately thereafter, some of the vaporized panel material solidifies and settles back within the grooves 20. This results in a groove 20 with a matt surface including a plurality of discontinuous diffusive sections 30 formed along the grooves 20.

The diffusive sections 30 typically take the form of discontinuous white appearing sections in the groove although the term "white" as used herein is intended to encompass many different diffused surfaces. The diffusive surface is advantageous since it increases the emission of the light panel 14 by diffusing more radiation than clear (i.e., internally reflective) grooves. The diffusive sections 30 are noticeably spaced apart from one another in the more shallow portions of the grooves 20 (near the edges of the panel 14). As the grooves 20 deepen, the diffusive sections 30 are formed closer together until an essentially continuous diffusive area is provided proximate the deepest part of the grooves 20.

The pulsing laser also causes a plurality of non-diffusive or internally reflective sections 32 to be formed along the grooves 20 with the plurality of diffusive sections 30. This is advantageous since the internally reflective sections 32 allow more radiation to propagate through the light panel 14 away from the light source than would be possible with a continuously diffusive groove. As such, more radiation reaches points in the light panel 14 distant from the light source. The internally reflective sections 32 typically take the form of clear sections within the groove although translucent or partially transparent sections may also be provided. The desired result is that the internally reflective sections 32 do not emit as much radiation as the diffusive sections 30 and cause some of radiation impinging thereon to internally reflect within the panel 14.

Figure 8:
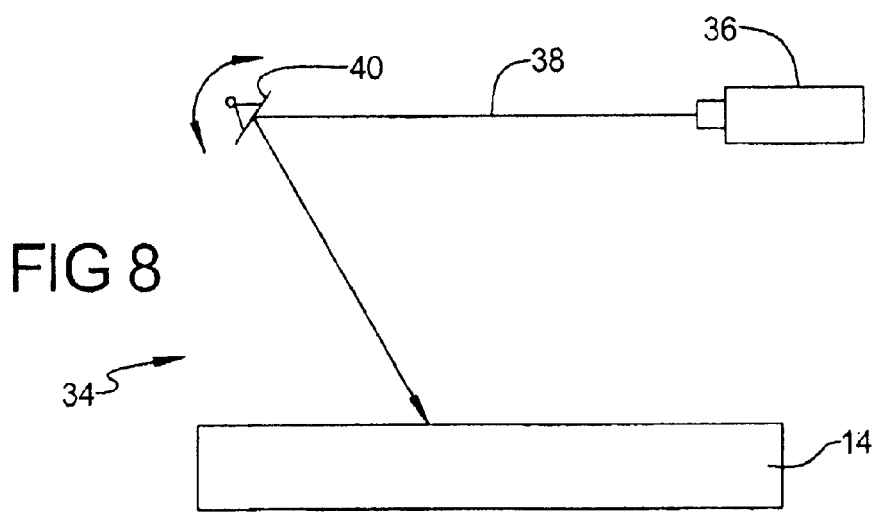
FIG. 8 is a schematic illustration of an apparatus for forming the light panel of the present invention.

Turning now to FIG. 8, an apparatus for etching the light panel 14 is illustrated generally at 34. The apparatus 34 includes a laser source 36 for providing a beam 38. A beam steering mechanism 40, such as one or more mirrors, is provided to direct the beam 38 as desired along the light panel 14. By manipulating the beam steering mechanism 40, the beam 38 may be directed to etch the light panel 14. Also, by varying at least one of the speed and power of the laser source 36, the depth of the etching can be controlled.

Although other laser sources may be used, a $CO_2$ laser is presently preferred. To etch a 24 inch square light panel formed of cast acrylic, the laser, operating at about 85 watts, may be set at 5% power at an edge of the panel and increased (preferably non-linearly) to 100% at the middle of the panel (for a double edge lit panel). The beam may be moved across the panel at about 26 inches per second and pulsed at about 500 pulses per inch. For a single edge lit panel, the power may be set to 5% at the light receiving edge of the panel and increased to 100% at the opposite edge. In either case, the grooves may be spaced apart by about 0.070 inch. To stagger the groove depth in the 24 inch double edge lit panel, the power may be set at, for example, 5% at 0 inches from the light receiving edge, 17% at 6 inches, 50% at 9 inches, and 100% at 12 inches. The power may then be reduced in the reverse pattern as the beam moves from the middle of the panel to the opposite edge.

In view of the foregoing, it can be appreciated that a laser etched light panel for a light box is provided. The etched grooves in the light panel deepen as they extend away from the light source. The degree of control provided over the width and depth of the grooves is greater than that previously available with mechanical etching techniques. The programmable power control of the laser allows extremely complex curves and variation in etch depth which are essentially impossible with mechanical techniques. The extreme thinness of the laser etched grooves allows the spacing of the grooves to be varied at will and to be placed very close together. The laser also allows discrete areas on the face of the panel to be etched, if desired. The laser may also be used for through cutting and polishing of the panel at the same time it is etched which also allows the panel to be cut into any desired shape. In the end, the laser-etched panel is 50–100% brighter than a mechanically etched panel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A display device comprising:
   a transparent panel having a light receiving edge and a face; and
   a plurality of laser etched grooves formed in the face of said panel, said grooves increasing in depth as said grooves extend away from the light receiving edge of said panel;
   wherein said grooves include plurality of diffusive sections and a plurality of internally reflective sections, interspaced with said plurality of diffusive sections.

2. The display device of claim 1 wherein said grooves include a bottom surface, said bottom surface corresponding to a contour of the face of said panel.

3. The display device of claim 1 further comprising a light source disposed adjacent said light receiving edge of said panel.

4. The display device of claim 3 wherein said light source further comprises at least one cold cathode fluorescent lamp.

5. The display device of claim 3 further comprising a frame enclosing said light source relative to said panel.

6. A display device comprising:
- a transparent panel having a light receiving edge and a face; and
- a plurality of grooves formed in the face of said panel, said grooves increasing in depth as said grooves extend away from the light receiving edge of said panel;
- wherein said grooves include a bottom surface, said bottom surface corresponding to a contour of the face of said panel; and
- said grooves include a plurality of diffusive sections and a plurality of internally reflective sections interspaced with said plurality of diffusive sections.

7. The display device of claim 6 wherein said grooves further comprise laser etched grooves.

8. The display device of claim 6 further comprising a light source disposed adjacent said light receiving edge of said panel.

9. The display device of claim 8 wherein said light source further comprises at least one cold cathode fluorescent lamp.

10. The display device of claim 8 further comprising a frame enclosing said light source relative to said panel.

11. A display device comprising:
- a transparent panel having a light receiving edge and a face; and
- a plurality of grooves formed in the face of said panel, said grooves increasing in depth as said grooves extend away from the light receiving edge of said panel;
- wherein said grooves include a plurality of diffusive sections and a plurality of internally reflective sections interspaced with said plurality of diffusive sections.

12. The display device of claim 11 wherein said grooves further comprise laser etched grooves.

13. The display device of claim 11 wherein said grooves include a bottom surface, said bottom surface matching a contour of the face of said panel.

14. The display device of claim 11 further comprising a light source disposed adjacent said light receiving edge of said panel.

15. The display device of claim 14 wherein said light source further comprises at least one cold cathode fluorescent lamp.

16. The display device of claim 14 further comprising a frame enclosing said light source relative to said panel.

* * * * *